United States Patent Office 3,495,281
Patented Feb. 17, 1970

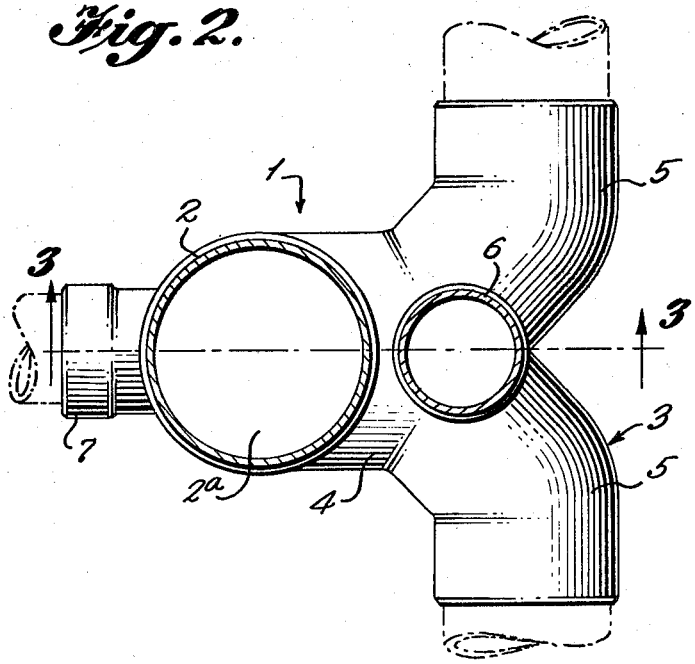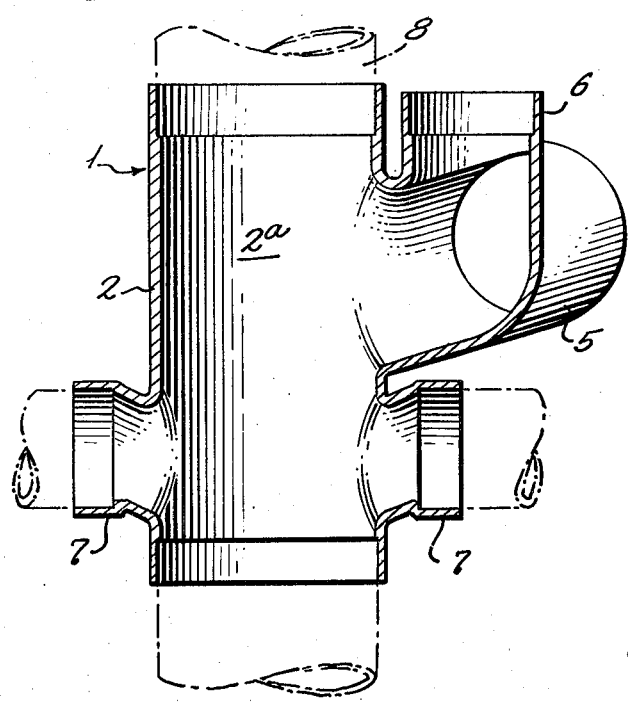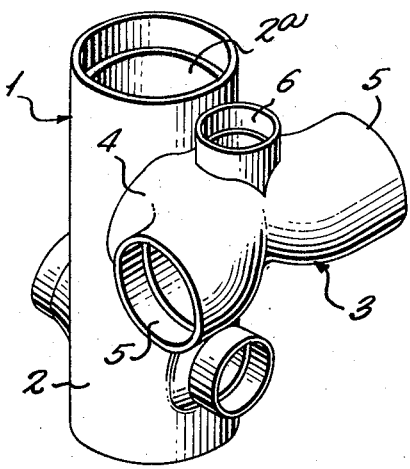

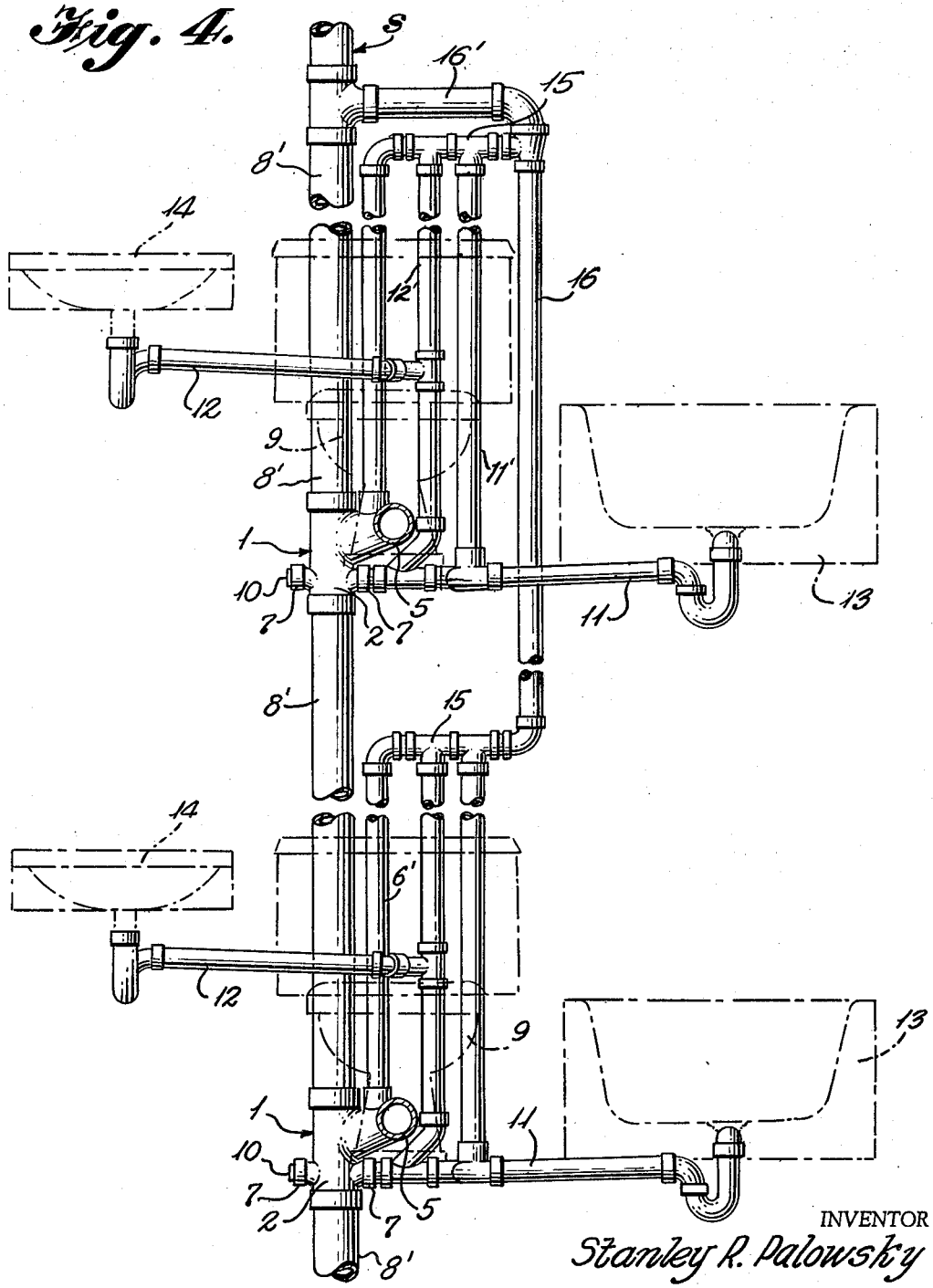

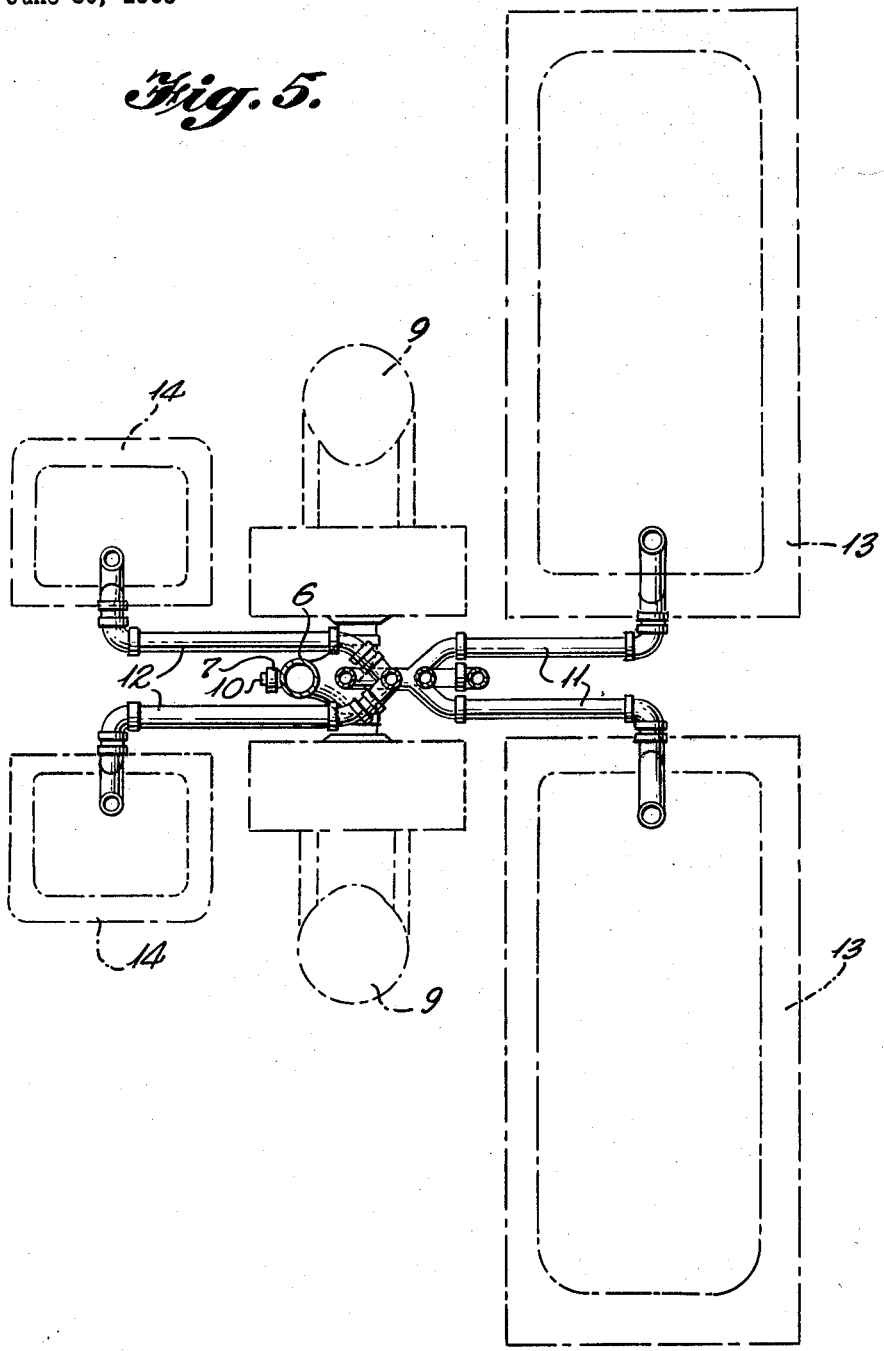

3,495,281
PLUMBING FITTING
Stanley R. Palowsky, 103 Somerset Drive,
Monroe, La. 71201
Filed June 30, 1966, Ser. No. 561,998
Int. Cl. E03d 9/04; F16l 41/00; E03c 1/12
U.S. Cl. 4—211      1 Claim

ABSTRACT OF THE DISCLOSURE

A unitary plumbing fitting for interconnecting the vent and waste drain lines of a plumbing system for a pair of bathroom units located on opposite sides of a partition wall.

---

The pipe fitting of the present invention is an improvement of the plumbing fitting assembly disclosed in my copending application, Ser. No. 377,205, filed June 23, 1964, now U.S. Patent 3,281,866 dated Nov. 1, 1966. The assembly described and claimed in the above-identified patent is designed to meet the need for utilizing available space in housing construction, particularly dormitories, motels and residential units, said assembly incorporating a waste drain fitting comprising an integral casting having a pair of water closet channels and a pair of waste branches communicating with the main passage of the fitting, which passage is connected at one end to a soil-vent stack and at the opposite end to a sewer line. Each of the water closet channels and the waste branches is formed with a vent branch connected by means of a vent pipe, which, in turn, is connected to a suitable vent manifold. It will thus be apparent that by means of the above-described arrangement, a pair of bathroom units can be located on opposite sides of a partition wall, the unitary waste drain fitting and the vent manifold providing a common plumbing fitting assembly for both bathroom units, thereby reducing the number of pipe fittings normally required for such installations, with concomitant savings in labor and material, and a more economical utilization of available space.

While the plumbing fitting assembly of my Patent 3,281,866 is economically and functionally satisfactory for its intended purpose, I have found, after further research and experimentation, that additional economies can be effected in conserving labor, space, and material, while maintaining desired functional efficiency, by means of the improved waste drain fitting and associated venting system of the present invention, which fitting comprises, essentially, a main body portion having a central passage adapted to be connected to a soil-vent stack; a horizontally disposed Y-connection integrally connected to and in fluid communication with said central passage, each arm of the Y-connection being adapted to be connected to a water closet branch line; a vertically extending vent passage formed at the junction of the arms of the Y-connection adapted for connection to a common vent pipe for the water closet branch lines; and a pair of waste branches arranged at right angles with respect to the water closet branch lines, said waste branches being positioned below the Y-connection and communicating with the central passage of the main body portion of the fitting.

It will thus be seen that by means of the above-described construction and arrangement, a pair of bathroom units, each consisting of a water closet, a bath tub and a wash basin, can be located on opposite sides of a partition wall and be connected to a soil-vent stack through the medium of a common fitting for both bathroom units, substantially reducing the number of fittings normally required for such installations.

An object of the invention is to provide an improved plumbing fitting in the form of an integral casting having a central passage adapted to be connected to a soil-vent stack, the central passage being integrally connected to and in fluid communication with the main branch of a horizontally disposed Y-connection, the arms of the Y-connection being adapted to be connected to water closet branch lines.

Another object of the invention is to provide an improved plumbing fitting formed as an integral casting and having a body portion formed with a vertically extending central passage adapted to be connected to a soil-vent stack, the central passage being integrally connected to and communicating with the main branch of a horizontally disposed Y-connection, the arms of the Y-connection being adapted to be connected to water closet branch lines; and a vertically extending vent passage formed at the junction of the arms of the Y-connection to thereby provide a common vent for the water closet branch lines.

Yet another object of the invention is to provide an improved plumbing fitting formed as an integral casting and having a main body portion formed with a vertically extending central passage adapted to be connected to a soil-vent stack, the main branch or leg of a horizontally disposed Y-connection communicating with said vertically extending central passage, the arms of the Y-connection being adapted to be connected to water closet branch lines; and waste branches formed on the fitting below the Y-connection and extending at right angles to the vertically extending central passage.

Still another object of the invention is to provide an improved plumbing fitting in the form of an integral casting, constructed and arranged to provide a common fitting adapted to accommodate the vent, waste, and water closet branch lines of pair of bathroom units located on opposite sides of a partition wall, whereby to substantially decrease the number of pipe fittings normally required for such installations, with a concomitant savings in labor and material, and a more economical utilization of available space.

With these and other objects in view, which may be incident to my improvements, the invention consists in the parts and combinations to be hereinafter set forth and claimed, with the understanding that the several necessary elements, comprising my invention, may be varied in construction, proportions and arrangements, without departing from the spirit and scope of the appended claims.

In order to make my invention more clearly understood, I have shown in the accompanying drawings means for carrying the same into practical effect, without limiting the improvements in their useful applications to the particular constructions which, for the purpose of explanation, have been made the subject of illustration.

In the drawings:

FIGURE 1 is a perspective view of the plumbing fitting of the present invention;

FIGURE 2 is a top plan view of the fitting illustrated in FIGURE 1;

FIGURE 3 is a sectional view of the fitting taken along line 3—3 of FIGURE 2;

FIGURE 4 is a side elevational view of a plumbing system for a multi-story building employing the fitting of the present invention; and FIGURE 5 is a top plan view of the plumbing system illustrated in FIGURE 4.

Referring to the drawings and more particularly to FIGURES 1 to 3, the plumbing fitting 1 of the present invention comprises, an integral casting having a main body portion 2 formed with a vertically extending central passage 2a adapted to be connected at one end to a soil-vent stack and at the opposite end to a sewer line, or between sections of a soil-vent stack, as will be described more fully hereinafter. A horizontally disposed Y-connection, designated generally by reference numeral 3, is integrally connected to main body portion 2 in such a manner that the main branch 4 of the Y-connection communicates with main passage 2a, and each of the arms 5 of the Y-connection is adapted to be connected to a water closet branch line. A vertically extending vent branch 6 is provided at the junction of arms 5, said vent branch being adapted to receive one end of a common vent line for the water closet branch lines, to be described more fully hereinafter. To complete the structure of the plumbing fitting, a pair of diametrically opposite waste branches 7 are formed on the main body portion of the fitting in the vicinity of the lower end thereof below the Y-connection and substantially parallel to the main branch 4 of the Y-connection.

As will be seen in FIGURE 3 of the drawing, the interior of the Y-connection does not include any baffles, partitions or the like and the junction of the arms 4 and 5 of the Y-connection is in close proximity to the main body portion 2. By this construction and arrangement, there is unobstructed passage for the flow of wastes from the water closet branch lines into the central passage 2a. The weight and cost of the fitting of the present invention are reduced by eliminating the baffles or partitions usually found in conventional water closet Y-connections, and by positioning the junction of the arms of the Y-connection in close proximity to the central passage, the necessity of baffles for directing the flow of wastes into the central passage is precluded.

Referring to FIGURES 4 and 5, there is shown a multistory building plumbing system employing the fitting of the present invention, wherein each of the fittings 1 of the main body portion 2 is connected between section 8' of a soil-vent stack S, which sections 8' communicate with the arms 5 of the Y-connection, each of the arms 5 being connected to a water closet 9. The soil-vent stack sections 8' also communicate with the waste branches 7 which are adapted to be selectively provided with a clean-out plug 10 or connected through suitable drain pipes 11 and 12 in such manner as to receive waste water from a pair of tubs 13 and a pair of wash basins 14, respectively. With reference to placement of the clean-out plug 10, it will be appreciated that selection of a particular waste branch 7 will depend upon the location of the bath tubs.

As will be seen in FIGURE 4, the vent branch 6 at the junction of the arms 5 of the Y-connection is connected through a vent pipe 6', a suitable header 15 and branch lines 16 and 16' to the soil-vent stack. The drain pipes 11 and 12 for waste water from the tubs 13 and the wash basins 14, respectively, are similarly connected through vent lines 11' and 12', header 15 and branch lines 16 and 16' to the soil vent stack.

While I have shown and described the preferred embodiment of my invention, I wish it to be understood that I do not confine myself to the precise details of construction herein set forth by way of illustration, as it is apparent that many changes and variations may be made therein, by those skilled in the art, without departing from the spirit of the invention or exceeding the scope of the appended claims.

I claim:
1. A unitary plumbing fitting for interconnecting a pair of bathroom units, each of the units consisting of a bath tub, a wash basin, and a water closet, located on opposite sides of a partition wall, said fitting comprising a main body portion formed with a vertically extending central passage, one end of said central passage being connected to a soil-vent stack, the opposite end of said passage being connected to a sewer line, a Y-connection incorporating a main branch and a pair of horizontally disposed arms, the main branch of the Y-connection being integrally connected to and in fluid communication with the central passage of the main body portion of the fitting, the arms of the Y-connection extending substantially transversely to the main branch of the Y-connection, each of the arms of the Y-connection being connected with a water closet branch line, a vertically extending vent branch formed at the junction of the arms of the Y-connection, said vent branch being connected to a common vent pipe for the water closet branch lines, the interior of the Y-connection being baffleless, the junction of the arms of the Y-connection being juxtaposed the vertically extending central passage of the main body portion, whereby wastes from the water closet branch lines flow substantially directly into the central passage of the main body portion, and a pair of waste branches integrally connected to and in fluid communication with the central passage of the main body portion of the fitting, said pair of waste branches being positioned below the Y-connection and substantially parallel to the main branch of the Y-connection.

References Cited

UNITED STATES PATENTS

| 788,803 | 5/1905 | Walker | 4—211 XR |
|---|---|---|---|
| 991,142 | 5/1911 | Erck | 285—153 |
| 1,052,254 | 2/1913 | Huss | 285—153 |
| 2,339,778 | 1/1944 | Groeniger | 4—211 |
| 2,686,321 | 8/1954 | Schmid | 4—252 |
| 2,916,310 | 12/1959 | Manas | 285—153 |
| 3,162,863 | 12/1964 | Wokas. | |
| 3,319,267 | 5/1967 | Pope | 4—252 |
| 2,379,669 | 7/1945 | Warren | 4—211 |

SAMUEL ROTHBERG, Primary Examiner

U.S. Cl. X.R.

4—252; 285—153